United States Patent [19]
Takeuchi et al.

[11] Patent Number: 5,755,539
[45] Date of Patent: May 26, 1998

[54] SHAPING MACHINE CAPABLE OF SUPPRESSING TILT

[75] Inventors: Tatsuya Takeuchi; Noritaka Ise; Tomoji Honda, all of Toyota; Toshio Kira, Mie-ken; Tetsuaki Hiura, Anjo, all of Japan

[73] Assignee: Toyota Jidosha Kabushiki Kaisha, Japan

[21] Appl. No.: 710,157

[22] Filed: Sep. 12, 1996

[30] Foreign Application Priority Data

Sep. 13, 1995 [JP] Japan ................... 7-235528

[51] Int. Cl.$^6$ ................................ B23D 41/08
[52] U.S. Cl. ................ 409/275; 409/280; 409/283
[58] Field of Search ........................ 409/269, 271, 409/275, 276, 264, 280, 281, 285, 283, 284, 287

[56] References Cited

U.S. PATENT DOCUMENTS

| 262,375 | 8/1882 | Cosgrove | 409/275 |
|---|---|---|---|
| 1,434,711 | 11/1922 | LaPointe | 409/284 |
| 1,463,272 | 7/1923 | Ragan | 405/285 X |
| 1,532,107 | 3/1925 | Ferris . | |
| 1,669,402 | 5/1928 | Hosking | 409/285 |
| 1,823,975 | 9/1931 | Ferris . | |
| 1,936,073 | 11/1933 | Russell | 409/275 |
| 2,315,476 | 3/1943 | Groene | 90/28.1 |
| 5,615,467 | 4/1997 | Simmons et al. | 29/27 C |

FOREIGN PATENT DOCUMENTS

| 56-39815 | 4/1981 | Japan . | |
|---|---|---|---|
| 141425 | 7/1985 | Japan | 409/281 |
| 62-255011 | 11/1987 | Japan . | |

*Primary Examiner*—William R. Briggs
*Attorney, Agent, or Firm*—Finnegan, Henderson, Farabow, Garrett & Dunner, L.L.P.

[57] ABSTRACT

A shaping machine wherein either a work or a tool is a rod-like member extending along a straight center line while the other is a member having a hole capable of being fitted on the rod-like member and wherein the work is shaped while the member having the hole passes through the rod-like member from one end toward the other end of the rod-like member. The shaping machine comprises a feed mechanism for causing relative movement of the rod-like member and the member having the hole to each other along the center line of the rod-like member, a center line of the feed mechanism being coincident with the center line of the rod-like member.

8 Claims, 2 Drawing Sheets

SHAPING MACHINE CAPABLE OF SUPPRESSING TILT

BACKGROUND OF THE INVENTION

1. Field of the Invention

This invention relates to broaching machines or like shaping machines for shaping a work into a predetermined shape by causing relative movements of the work and a tool. Particularly, the invention concerns a shaping machine in which either a work or a tool is a rod-like member extending along a straight center line while the other is a member having a hole capable of being fitted on the rod-like member. By the shaping machine, the work is shaped into a predetermined shape while the member having the hole passes through the rod-like member from one end toward the other end of the rod-like member. One example of such a shaping machine is a broaching machine in which a surface of a hole of a nut-like work is finished while the nut-like work passes through a rod-like broach cutter from one end toward the other end.

2. Description of the Prior Art

A prior art shaping machine pertaining to the invention is disclosed in Japanese Laid-Open Patent Publication No. 62-255011. FIG. 2 is a front view showing the shaping machine.

The illustrated shaping machine 1 is a vertical broaching machine for cutting a helical groove in an inner surface of a nut-like work w having a central through hole. The machine has two helical broaches 4 mounted in a column 2 by a drive mechanism 6 and support mechanisms 7. The column 2 has opposite side guides 9. A table 8 for supporting works w is vertically movable along the guides 9. The table 8 is driven by a table drive 3 which comprises a rack and pinion mechanism (not shown). Rising of the table 8 causes a lead bar 5 to be rotated by thread means, and the torque of the lead bar 5 is transmitted through the drive mechanism 6 to the two helical broaches 4.

While the table 8 is raised by a predetermined distance from its lower set position, the two works w are processed by the respective helical broaches 4 to form helical grooves in their inner surfaces.

In this broaching machine 1, the nut-like work w is shaped while the work w passes through the helical broach 4 from the lower end toward the upper end. In the machine, it is required for the lower end of the broach 4 to be secured to and released from the support mechanism 7, so that a work w to be shaped can be set to the lower end of the broach 4. Further, it is required for the upper end of the broach 4 to be secured to and released from the drive mechanism 6 so that the finished work w can be removed from the upper end of the broach 4.

Since it is very difficult to arrange the rack and pinion mechanism for raising and lowering the table 8 and the helical broach 4 in a co-axial relation, with a mechanism for securing and releasing the lower and upper ends of the broach 4 to and from the support mechanism 7 and drive mechanism 6 being provided in the machine, the rack and pinion mechanism is arranged on the table 8 at a place different from the place where the work w and the broach 4 are located.

In this broaching machine 1, a center line of the rack and pinion mechanism for raising and lowering the work support table 8 is not coincident with but is off-set from the axis (i.e., center line) of each helical broach 4. Therefore, resistance caused by the helical broach 4 against the work w during the shaping process and raising force provided by the rack and pinion mechanism tend to cause the work w to be rotated vertically, thus generating a tilt of the work w with respect to the broach 4. This results in lower finishing accuracy.

For suppressing the tilt of the work w with respect to the broach 4, it is effective to increase the rigidity of the guides 9 of the column 2 and the table 8 or the like parts. Increasing the rigidity, however, results in an increase of the machine size.

SUMMARY OF THE INVENTION

An object of the invention is to provide a shaping machine for shaping a work into a predetermined shape while a member having a hole passes through a rod-like member from one end toward the other end of the rod-like member, which can suppress the work from being tilted while being shaped.

Another object of the invention is to provide a more compact shaping machine having lower rigidity compared to the prior art.

The work to be shaped according to one aspect of the invention has a through hole like a nut. The invention is effective when shaping the through hole surface with a rod-like tool such as a broach cutter. The work is shaped into a predetermined shape while the nut-like work passes through the rod-like tool from one end toward the other end of the tool.

According to the aspect of the invention, a mechanism for feeding the work along the rod-like tool from one end toward the other end of the tool is provided. In a prior art shaping machine, such feed mechanism is provided at an off-set position from the center line of the rod-like tool in order to avoid interference between the rod-like tool and the feed mechanism or between the feed mechanism and the mechanism for securing and releasing the tool to and from a tool supporting member. According to the invention, the center line of the feed mechanism is coincident with the center line of the rod-like tool without interference between the feed mechanism and the tool and also without interference between the feed mechanism and the mechanism for securing and releasing the tool. Thus, according to the invention, no moment tending to tilt the work is generated between the work and the tool.

The feed mechanism preferably includes a pipe which accommodates the rod-like tool. The tool accommodated in the pipe does not interfere with the feed mechanism, while the rod-like tool can be concentric with the feed mechanism. Moreover, a rod may be inserted in the pipe to secure and release the rod-like tool to and from the tool supporting member.

The invention can also be used to shape an outer periphery of a rod-like work by moving a shaping tool having a hole along the rod-like work from one end toward the other end of the work.

The invention will be more fully understood from the following detailed description and appended claims when taken along with the accompanying drawings.

DETAILED DESCRIPTION OF THE PREFERRED EMBODIMENT

Figure 1:
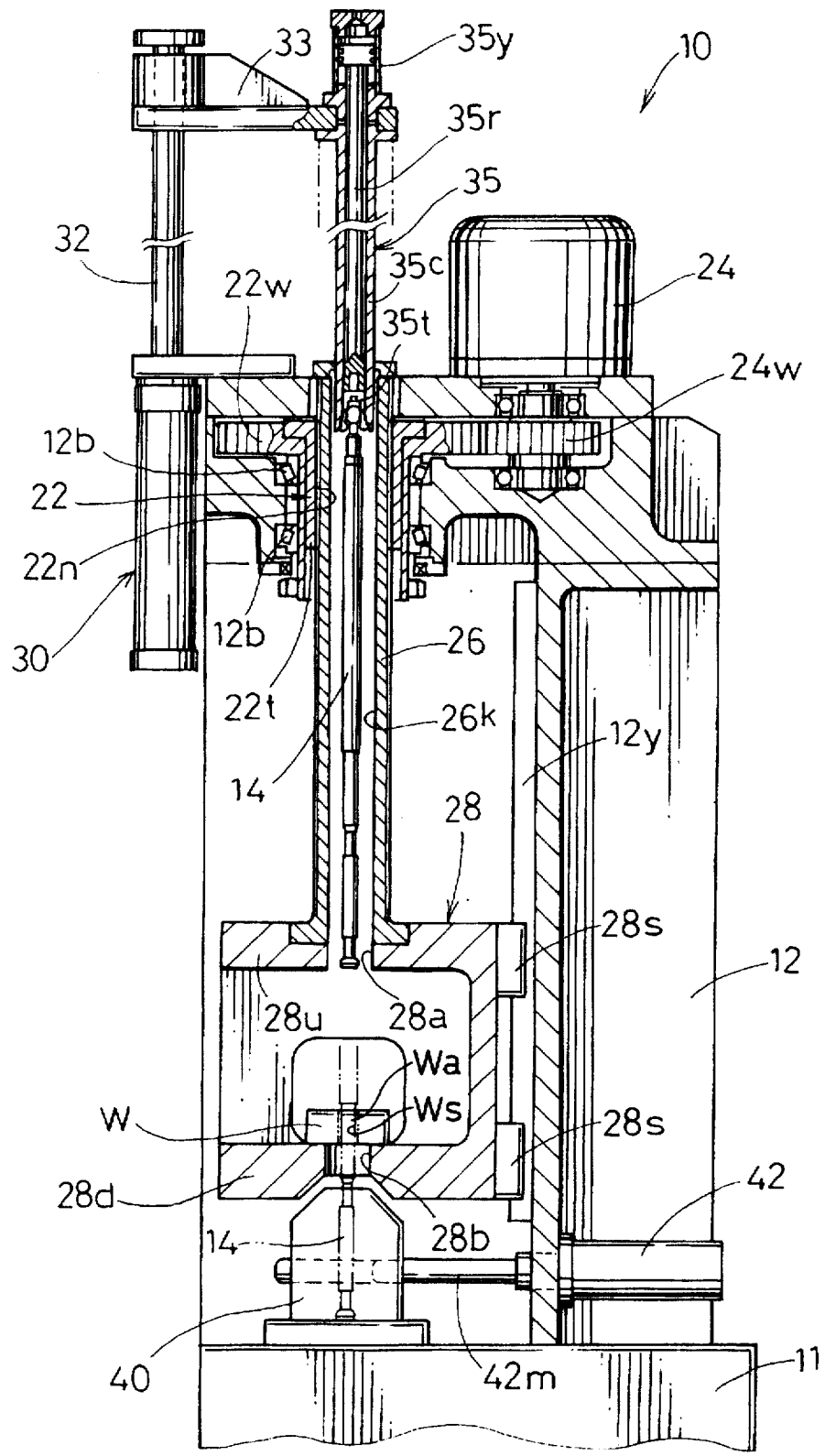
FIG. 1 is a fragmentary sectional view showing a broaching machine according to an embodiment of the invention.
Figure 2:
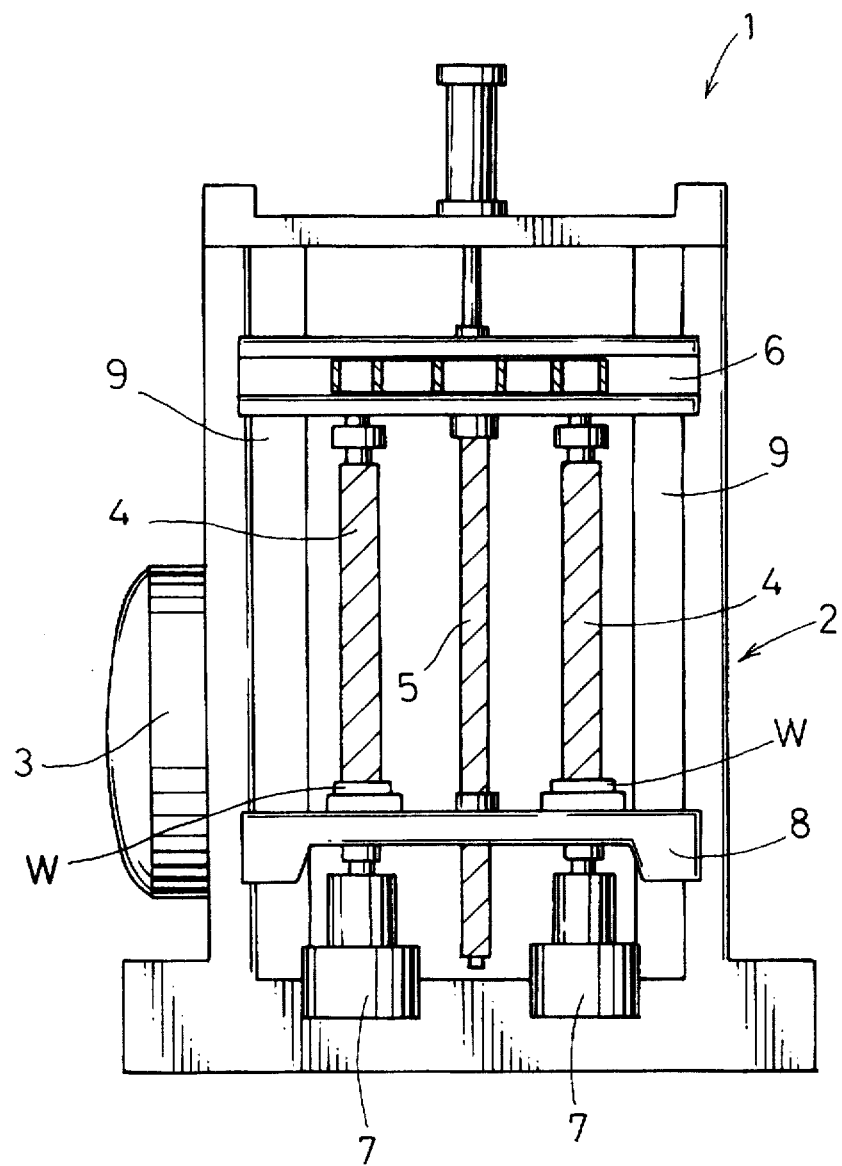
FIG. 2 is a front view showing a prior art broaching machine.

A shaping machine according to an embodiment of the invention will now be described with reference to FIG. 1.

The shaping machine according to this embodiment is a vertical broaching machine 10 for broaching an inner surface ws of a through hole wa in a work w. The machine has a column 12 extending upright from a bed 11. The column 12 has a sectional profile of an inverted L-shaped configuration. A nut 22 is mounted vertically on the horizontal top portion of the column 12. The nut 22 has a cylindrical portion 22t with a female thread 22n formed therein and a flange-like gear portion 22w atop the cylindrical portion 22t. The cylindrical portion 22t is mounted in bearings 12b such that it is rotatable about its axis relative to the column 12 but is axially immovable.

A feed motor 24 is secured downward to the top of the column 12, and is secured to a feed gear 24w which engages the gear portion 22w of the nut 22. The nut 22 thus can be rotated by a predetermined angle about its axis by operating the feed motor 24.

A pipe-like screw 26 having a feed screw formed in the outer periphery is screwed in the female thread 22n of the nut 22, and on the lower end of the pipe-like screw 26 is mounted a work holder 28 which can hold a work w. The work holder 28 is a box-like member having a ceiling 28u and a bottom 28d, which have an upper through hole 28a and a lower through hole 28b, respectively, these holes 28a and 28b being coaxial with the extension of an axis of a through hole 26k of the pipe-like screw 26. The work w is set on top of the bottom 28d such that it Is concentric with the lower through hole 28b.

Slide members 28s are secured to an upper portion and a lower portion of the work holder 28 on one side thereof, and are slidably engaged with a vertical guide 12y mounted on the column 12. The pipe-like screw 26 and the work holder 28 are thus incapable of being rotated, but they can be raised and lowered by screw action with rotation of the nut 22.

A lift cylinder 30 is secured to the top portion of the column 12 on the side thereof opposite the feed motor 24, and has a piston rod 32 on which a stem portion of a horizontal support 33 is mounted. The horizontal support 33 has a free end on which a rod-like tool lift holder 35 is mounted coaxially with the pipe-like screw 26. The tool lift holder 35 is inserted in the pipe-like screw 26, and extends through the through hole 26k of the pipe 26.

The tool lift holder 35 is Inserted in the thorough hole 26k while holding an upper end of a broach cutter 14, and has a pipe-like case portion 35c. The case portion 35c has a chuck 35t mounted on its free end (i.e., lower end) and a chuck cylinder 35y mounted on its upper end. The case portion 35c further accommodates a transmission rod 35r for transmitting the movement of the chuck cylinder 35y to the chuck 35t.

With the above construction, by operating the lift cylinder 30, the tool lift holder 35 holding the upper end of the broach cutter 14 is raised or lowered through the pipe-like screw 26. With movement of the chuck cylinder 35y, the rod-like tool lift holder 35 is secured to or released from the upper end of the broach cutter 14. The broach cutter 14 is a rod-like cutting tool.

Right underneath the lower through hole 28b of the work holder 28, a tool holder 40 is secured to the top of the bed 11 such as to releasably position the lower end of the broach cutter 14. A tool cutter 42 is horizontally mounted in a lower portion of the column 12 such as to secure the lower end of the broach cutter 14 positioned by the tool holder 40, with respect to the tool holder 40. The tool cotter 42 has a horizontal movable member 42m. The lower end of the broach cutter 14 is secured to the tool holder 40 by extending the movable member 42m horizontally into engagement with the tool holder 40 and also with the broach cutter 14.

The operation of the broaching machine 10 according to this embodiment will now be described.

As shown in FIG. 1, first the upper end of the broach cutter 14 is chucked in the chuck 35t of the tool lift holder 35, and then the lift cylinder 30 is operated to advance the piston rod 32 so as to bring the broach cutter 14 and the tool lift holder 35 to upper set positions thereof. At this time, the pipe-like screw 26 and the work holder 28 are held at their lower set positions. In this state, the lower end of the broach cutter 14 is separated from the tool holder 40 and the work w to be finished is set in the work holder 28 at a predetermined position thereof.

Subsequently, the lift cylinder 30 is operated to retreat the piston rod 32, thus lowering the tool lift holder 35 and the broach cutter 14 through the pipe-like screw 26. Thus, the free lower end of the broach cutter 14 is passed through the upper through hole 28a of the work holder 28, then the through hole wa of the work w and then the lower through hole 28b of the work holder 28 and is inserted into the tool holder 40 (as shown by dashed lines in FIG. 1), so that the tool cotter 42 is operated to bring the movable member 42m thereof into engagement with the free lower end of the broach cutter 14. The free lower end of the broach cutter 14 is thus secured to the tool holder 40, and the work w to be finished is set to the lower end of the broach cutter 14. At this time, the other end of the broach cutter 14 is held secured to the tool lift holder 35.

When the preparations for the broaching operation thus have been completed, the feed motor 24 is operated to rotate the nut 22 via the feed gear 24w and the gear portion 22w. The rotation of the nut 22 causes the pipe-like screw 26 to be raised by the screw action, thus causing the work holder 28 secured to the pipe-like screw 26 to be raised along the guide 12y of the column 12. With the rising of the work holder 28, the work w set therein rises along and coaxially with the rod-like broach cutter 14, that is, the work w having the through hole wa proceeds along the rod-like broach cutter 14 from the lower end toward the other end (upper end). During this time, the inner surface ws of the through hole wa of the work w is finished by the broach cutter 14.

The finishing process of the work w is completed when the top face of the pipe-like screw 26 is brought into contact with an upper portion of the tool lift holder 35 (i.e., the locality thereof supported by the horizontal support 33). At this time, the chuck 35t of the tool lift holder 35 is opened to release the tool lift holder 35 from the broach cutter 14. The lift cylinder 30 now can be moved by external forces. To take out the finished work w from the upper end of the broach cutter 14, the pipe-like screw 26, the work holder 28 and the work w are further raised, so that the tool lift holder 35 and the horizontal support 33 supporting the tool lift holder 35 are raised by the pipe-like screw 26. As a result, the upper end of the broach cutter 14 is separated from the lower end of the tool lift holder 35. The work w is thus taken out from the upper end of the broach cutter 14. After the pipe-like screw 26 and the work holder 28 have been brought to their upper set positions, the work w is removed from the work holder 28.

When the broaching of the first work w has been completed in the above way, the feed motor 24 is operated reversely to cause reverse rotation of the nut 22, thus lowering the pipe-like screw 26 and the work holder 28 down to the initial positions (i.e., lower set positions) thereof. Also, the lift cylinder 30 is operated to retreat the piston rod 32 so as to lower the tool lift holder 35 until the lower end of the tool lift holder 35 is in contact with the upper end of the broach cutter 14. The upper end of the broach cutter 14 is thus chucked again in the chuck 35t of the tool lift holder 35. Further, the movable member 42m of the tool cotter 42 is withdrawn from the tool holder 40 to release the lower end of the broach cutter. To set the next work w, the lift cylinder 30 is operated again to advance the piston rod 32 from this state. As shown in FIG. 1, the broach cutter 14 and the tool lift holder 35 are thus raised, so that the next work w can be set in the work holder 28 at a predetermined position thereof. The next work w is shaped or finished in the same way as the first work w. The pipe-like screw 26 and nut 22 constitute a feed mechanism according to the invention. In other words, the feed mechanism comprises the pipe-like screw 26 accommodating the rod-like broach cutter 14 and the tool lift holder 35.

As has been described, in the vertical broaching machine according to the invention, the center line of the pipe-like screw 26, etc. constituting the feed mechanism is not off-set from the axis (or center line) of the broach cutter 14. Thus, the resistance caused by the broach cutter 14 against the work during the shaping process and the raising force provided by the pipe-like screw 26 do not produce any moment tending to tilt the work w with respect to the broach cutter 14. The work w being worked thus is not tilted. It is thus possible to improve the finishing accuracy, reduce the rigidity of the work holder 28, guide 12y, column 12, etc. compared to that in the prior art, and reduce the cost of manufacture.

According to this embodiment, a rod-like member 14, a feeding mechanism (nut 22 and screw 26) of a nut-like work w, means 40 for releasably securing the lower end of the rod-like member 14 and means 35 for releasably securing the upper end of the rod-like member 14 are arranged in a co-axial relation. The means 40 and the means 35 are capable of releasing the lower and upper ends, respectively.

While a preferred embodiment of the invention has been described, the embodiment covers the following various technical matters in addition to those as set forth in the appended claims.

A cutting machine which comprises a feed mechanism including a pipe-like screw and a cutting tool movable therethrough.

This structure does not require any cutting tool cover. In addition, since the cutting tool and the feed screw can be set at the same position, it is possible to manufacture a compact cutting machine.

While in the embodiment, the feed mechanism is constituted by the pipe-like screw 26, the nut 22, etc., alternatively it is possible to utilize a guide bar and an oil hydraulic cylinder or the like. It is also possible to utilize a rack and a pinion and a motor or the like. It is further possible to utilize a conical screw and a motor or the like.

While in the embodiment, the broach cutter 14 is used as a rod-like tool, this is by no means limitative; it is possible to use a drill, a reamer, etc. as the rod-like tool. While in the embodiment, a rod-like tool is used, it is possible to utilize the invention for shaping the outer periphery of a rod-like work with a shaping tool having a hole. With an arrangement that a nut-like work is moved along a rod-like tool held stationary from one end toward the other end of the tool as in the embodiment, the distance required for the work to be moved may be made substantially equal to the length of the rod-like tool, thus permitting the reduction of the travel of the machine. In the embodiment, the two ends of the rod-like member are alternately made to be free. Thus, the work which has been passed along the rod-like tool from one end toward the other end of the tool, may be taken out of the tool without need of being returned to the afore-said one end. It is thus possible to form a complicated finished surface.

While the invention has been described with reference to a preferred embodiment thereof, it is to be understood that modifications or variations may be easily made without departing from the scope of the invention which is defined by the appended claims.

What is claimed is:

1. A shaping machine wherein either a work or a tool is a rod-like member extending along a straight center line while the other is a member having a hole capable of being fitted on the rod-like member, and wherein the work is shaped while the member having the hole moves alone the rod-like member from one end toward the other end of the rod-like member, comprising a feed mechanism for causing relative movement of the rod-like member and the member having the hole to each other along the center line of the rod-like member, a center line of the feed mechanism being coincident with the center line of the rod-like member, means for releasably securing the rod-like member at both its ends, respectively, the feed mechanism including means for feeding the member having the hole along the stationary rod-like member from said one end toward said other end of the rod-like member, the feeding means including a pipe for accommodating the rod-like member.

2. The shaping machine according to claim 1, wherein the pipe has a feed screw formed in the outer periphery.

3. The shaping machine according to claim 1, further comprising a mechanism for securing and releasing the rod-like member to and from the securing means, the mechanism including a rod extending through a through hole of the pipe.

4. A broaching machine comprising:

an elongate broach cutter; and a feed mechanism for feeding a work having a hole to be broached by the broach cutter, along the broach cutter such that the work passes over the broach cutter from one end toward the other end of the broach cutter;

a center line of the feed mechanism being coincident with a center line of the broach cutter; and wherein the feed mechanism includes a pipe for accommodating the broach cutter.

5. The broaching machine according to claim 4, wherein the pipe has a feed screw formed in the outer periphery.

6. The broaching machine according to claim 4, further comprising:

means for releasably securing said one end of the broach cutter; and a mechanism for securing and releasing said one end of the broach cutter to and from the securing means by taking hold of the other end of the broach cutter;

the securing and releasing mechanism including a rod extending through a through hole of the pipe;

said other end of the broach cutter being capable of being secured to and released from one end of the rod.

7. The broaching machine according to claim 6, further comprising a mechanism for moving the rod along the center line of the broach cutter.

8. The broaching machine according to claim 4, wherein the broach cutter is a helical cutter.

* * * * *